Patented Feb. 22, 1944

2,342,582

UNITED STATES PATENT OFFICE 2,342,582

ALLYL POLYMER

George W. Hooker, Stephen C. Stowe, and Sylvia M. Stoesser, Midland, Mich., assignors to Thiokol Corporation, Trenton, N. J., a corporation of Delaware No Drawing. Application May 24, 1940, Serial No. 337,010

9 Claims. (Cl. 260—79)

This invention relates to the production of organic polymeric products.

It is an object of the invention to prepare a reaction product of an alkaline tetrasulfide and an allyl halide.

It is a further object of the invention to prepare reaction products of alkaline polysulfides and compounds having the general formula

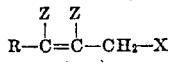

where R represents hydrogen or alkyl, Z represents hydrogen, alkyl or halogen and X is a substituent which is split off during the polysulfide reaction.

It is a further object of the invention to polymerize said reaction products.

It is a further object of the invention to prepare a reaction product of the type mentioned in an intermediate form capable of transformation by polymerization into a solid polymer, the reaction product in said intermediate form being a liquid which can be used for impregnation purposes without the necessity of employing a solvent. When so used, the impregnated product may be heated to cause the liquid reaction product to polymerize. Numerous substances of a porous or fibrous nature can thus be impregnated with the liquid intermediate potentially reactive reaction product and then submitted to heat to polymerize said liquid product.

Among the numerous porous or fibrous products which may be thus treated, there may be mentioned paper, felted or woven fabrics and other articles made from natural or synthetic fibres, various inorganic and organic filling material including wood flour, wood pulp, carbon black, barytes, China clay, rotten stone, infusorial earth, etc.

A specific illustrative example of the preparation of the immediate reaction product in liquid form can be given as follows:

*Example.*—To 8 liters of a 2.5 molar solution of sodium tetrasulfide in a 12 liter flask equipped with a reflux condenser, stirrer and separatory funnel and packed in ice, there is added dropwise over a period of several hours 3060 grams of allyl chloride with rapid stirring. The allyl chloride reacts readily with the alkaline polysulfide with the evolution of heat, and cooling is desirably employed, in conjunction with gradual addition of the allyl chloride, in order to prevent undue rise of temperature. The reaction produces approximately 5500 grams of a heavy oil which is separated from the aqueous by-products and may be washed with water and dried.

The liquid reaction product may be polymerized per se or, after being used as an impregnating agent by heating at an elevated temperature, as for example, during a period of about three days at about 125° C., at the end of which time it is converted into a hard condition of polymerization. In attaining this condition it passes through stages of progressively increasing viscosity and the polymerization may be arrested at any desired point to secure a predetermined consistency or viscosity, or degree of hardness or softness.

The polymerization of the liquid product may be effected in the presence of butadiene, isoprene, chloroprene, styrene and the like, respectively, to form copolymers.

Instead of allyl chloride, other allyl halides may be employed, and instead of the halogen substituent, other substituents which are split off during the reaction with polysulfide may be employed, for example, formate, acetate, propionate, etc. Instead of allyl compounds, methallyl, ethallyl, propallyl compounds, etc. may be employed, and in general compounds having the formula

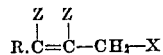

may be employed wherein R represents hydrogen or an alkyl radical, Z represents hydrogen, alkyl or halogen and X is a substituent which is split off during the reaction with polysulfide. Further examples of the genus stated are 2-methallyl chloride, 2-chlorallyl chloride and 2-methyl-3-chlorallyl chloride.

Instead of sodium tetrasulfide, alkaline tetrasulfides in general may be employed, e. g., ammonium, sodium, calcium, barium, etc., tetrasulfides, pentasulfides and hexasulfides.

We claim:

1. A process which comprises reacting an alkaline tetrasulfide with a compound having the formula

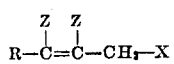

where R is selected from the group consisting of hydrogen and alkyl, Z is selected from the group consisting of hydrogen, alkyl and halogen and X is a substituent which is split off during the tetrasulfide reaction.

2. A process which comprises reacting an alkaline tetrasulfide with an allyl halide.

3. A process which comprises reacting an alkaline tetrasulfide with allyl chloride.

4. A process which comprises reacting an alkaline tetrasulfide with methallyl chloride.

5. A process which comprises heating a liquid reaction product of an alkaline tetrasulfide and an allyl halide and converting the said liquid reaction product into a solid polymer.

6. A process which comprises heating the liquid reaction product of an alkaline tetrasulfide and a compound having the formula $$R-\underset{\underset{Z}{|}}{C}=\underset{\underset{Z}{|}}{C}-CH_2-X$$

where R is selected from the group consisting of hydrogen and alkyl, Z is selected from the group consisting of hydrogen, alkyl and halogen and X is a substituent which is split off during the tetrasulfide reaction, and thereby converting said liquid reaction product into a solid polymer.

7. A process which comprises impregnating an absorptive body with a liquid reaction product of an alkaline tetrasulfide and a compound having the formula $$R-\underset{\underset{Z}{|}}{C}=\underset{\underset{Z}{|}}{C}-CH_2-X$$

where R is selected from the group consisting of hydrogen and alkyl, Z is selected from the group consisting of hydrogen, alkyl and halogen and X is a substituent which is split off during the tetrasulfide reaction, and heating said impregnated body to convert said liquid reaction product into a solid polymer.

8. As a composition of matter, a polymerized reaction product of an alkaline tetrasulfide and an allyl compound having the formula $$R-\underset{\underset{Z}{|}}{C}=\underset{\underset{Z}{|}}{C}-CH_2-X$$

where R is selected from the group consisting of hydrogen and alkyl, Z is selected from the group consisting of hydrogen, alkyl and halogen and X is a substituent which is split off during the reaction.

9. As a composition of matter, a polymerized reaction product of an alkaline tetrasulfide and allyl chloride.

GEORGE W. HOOKER.
STEPHEN C. STOWE.
SYLVIA M. STOESSER.